United States Patent [19]

Moore

[11] 4,014,401
[45] Mar. 29, 1977

[54] LOW-COST, RUGGEDLY SIMPLE, OVERTURN-PREVENTING VEHICLE

[76] Inventor: Alvin Edward Moore, Manini Way, Diamondhead, Rte. 1, Bay St. Louis, Miss. 39520

[22] Filed: July 7, 1975

[21] Appl. No.: 593,716

Related U.S. Application Data

[63] Continuation-in-part of Ser. No. 462,734, April 22, 1974, Pat. No. 3,944,008.

[52] U.S. Cl. .................................. 180/22; 293/1; 293/62
[51] Int. Cl.$^2$ .................................. B62D 61/12
[58] Field of Search .................. 180/21, 22, 25 R; 280/282, 293, 150 A, 150 C; 52/DIG. 9; 293/1, 62

[56] References Cited

UNITED STATES PATENTS

| | | | |
|---|---|---|---|
| 700,926 | 5/1902 | Hicks | 180/22 |
| 947,112 | 1/1910 | Love | 280/150 C |
| 1,197,526 | 9/1916 | Meseke | 180/21 |
| 1,501,304 | 7/1924 | Boehm | 280/293 |
| 1,607,236 | 11/1926 | Bumstead | 180/25 R |
| 2,986,400 | 5/1961 | Phillips | 280/261 X |
| 2,995,378 | 8/1961 | Whetstone | 280/261 X |
| 3,575,251 | 4/1971 | Moore | 180/30 |
| 3,881,566 | 5/1975 | Moore | 180/30 |
| 3,884,521 | 5/1975 | Moore | 180/30 |

FOREIGN PATENTS OR APPLICATIONS

| | | | |
|---|---|---|---|
| 516,439 | 1/1953 | Belgium | 180/21 |
| 1,276,249 | 10/1961 | France | 180/21 |
| 1,048,821 | 11/1966 | United Kingdom | 180/21 |

*Primary Examiner*—Joseph F. Peters
*Assistant Examiner*—John P. Silverstrim

[57] ABSTRACT

A simplified, economical vehicle is disclosed. A steerable front wheel, on the side of the vehicle toward the center of a roadway, is turned by motorcycle-like steering forks. A single powered rear wheel, aligned with the front wheel in a fore-and-aft driving axis, is driven, without a differential, by an electric motor or other motive power. In three of the inventive forms there is only the one front wheel; in another, preferred form there is at least one other front wheel, on the side of the driving axis away from the center of the roadway. It is optionally on the ground all the time during land travel — or, optionally, normally clear of the ground and contacting it only when the vehicle tilts dangerously toward this wheel. It is swivelly mounted for turning into the plane of vehicle motion. Optionally, there is a second front castor wheel, on the side of the steerable wheel toward the roadway center. In the preferred form and two of the other inventive forms there are shown two freely rotatable rear wheels — one on each side of the driving wheel and substantially coaxial with it. One of these is on the side of the driving wheel away from the roadway center and is preferably on the ground all the time of land travel; but the other, an optional wheel, is preferably clear of the roadway in normal travel and contacts it only when the vehicle tilts dangerously toward it. A buffer, made of upright cans or the like, sheathed in waterproof material, extends around the vehicle. It provides wheel wells for the side wheels, and has running boards and higher elevations above the side wheels.

11 Claims, 11 Drawing Figures

U.S. Patent   Mar. 29, 1977   Sheet 2 of 2   4,014,401
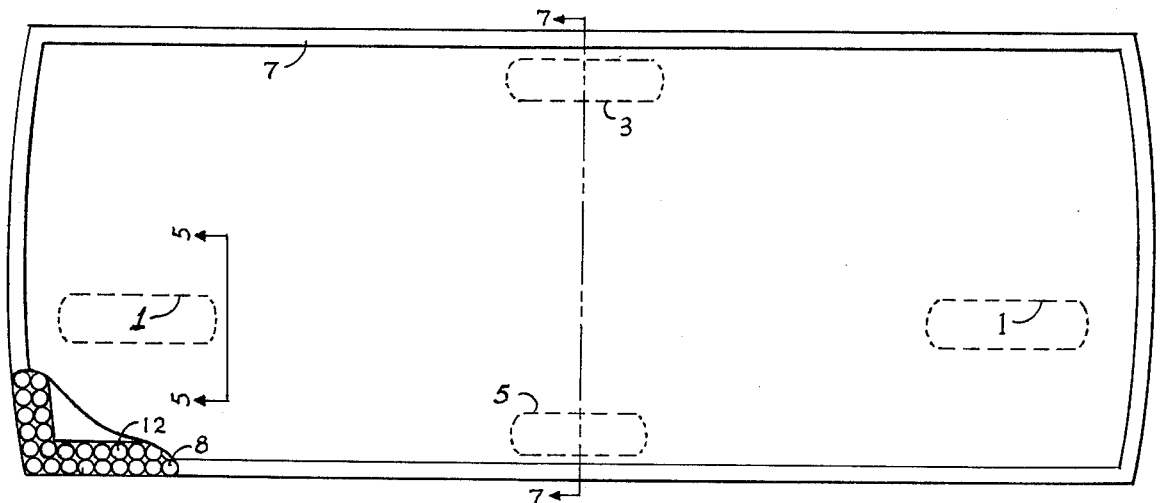
FIG. 4
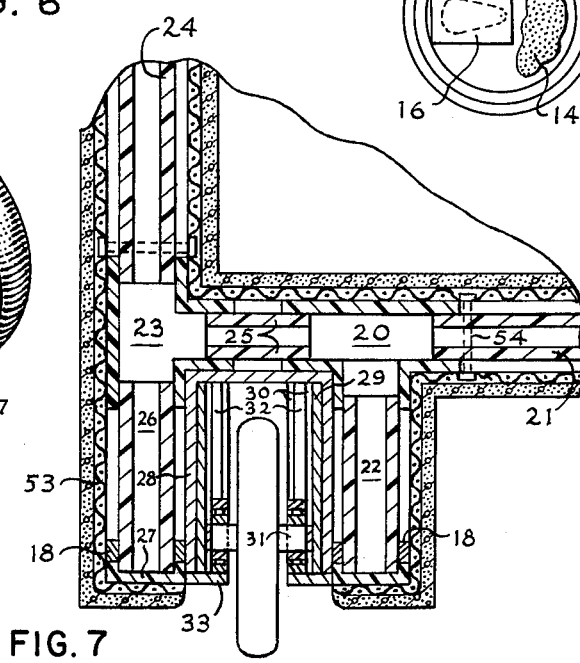
FIG. 6
FIG. 8
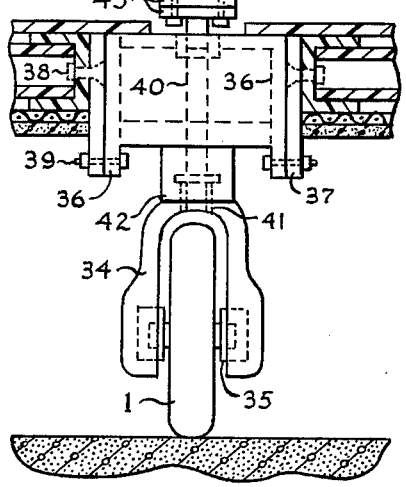
FIG. 5
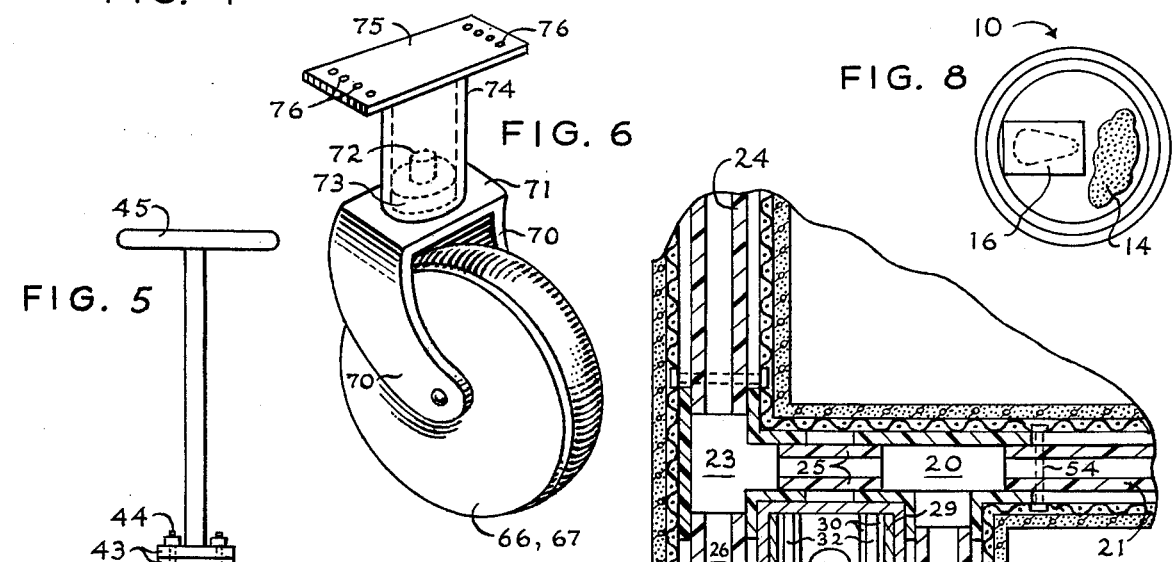
FIG. 7
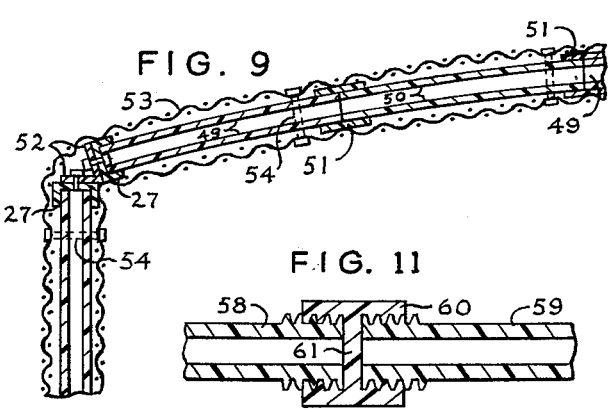
FIG. 9
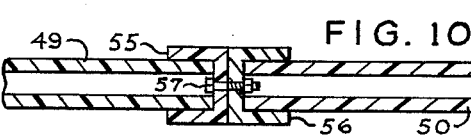
FIG. 10
FIG. 11

4,014,401

LOW-COST, RUGGEDLY SIMPLE, OVERTURN-PREVENTING VEHICLE

This application is a continuation-in-part of application Ser. No. 462,734, filed on Apr. 22, 1974, now U.S. Pat No. 3,944,008. Except for slight drafting changes, some changes in drawing numerals and more emphasis of the difference in diameters of sidewheels 3 and 5 in FIG. 4, the present FIGS. 4, 5, 7, 8, 9, 10 and 11 are copies, respectively, of FIGS. 4, 9, 8, 12, 13 and 14 of application Ser. No. 462,734; and present FIG. 1 and parts of FIGS. 2 and 3 illustrate described in the specification of this prior application. In some respects, the present application comprises improvements of the inventor's prior U.S. Pat. No. 3,575,251 of Apr. 20, 1971.

The present invention pertains to a light-weight, safe, economically built vehicle including at least four wheels; two of these wheels being a fore-and-aft-aligned steering wheel and vehicle-driving wheel; at least two other freely rotating wheels having no power connection or driver-steering control and serving only for stability of the vehicle.

An object of this invention is to provide a wheeled vehicle having the rugged simplicity, lightness in weight and economy of: only a single rear driving wheel (with no heavy, expensive differential); a single front steerable wheel (with no heavy, expensive steering-power means — no steering gears, rods, levers or knuckle joints); front and rear wheels that are alined in a longitudinal axis that is offset from the center fore-and-aft line of the vehicle; one freely rotating sidewheel that optionally may be a little clear of the road surface in normal travel but in travel is preferably always in contact with the road; and for safe stability at least one other freely rotating sidewheel that optionally is a little clear of the road surface in normal travel, but contacts this surface on excessive vehicular roll. Another object of the invention is to provide such a vehicle with at least four wheels, having a longitudinal driving axis between the steerable wheel and power-driven wheel that is offset from the center fore-and-aft line of the vehicle, in which one of the two freely rotating sidewheels (preferably clear of the road in normal travel) is on the same side of this center line as the driving wheel and the other freely rotating wheel (preferably in contact with the road in normal travel) is on a side of the center line that is opposite from the driving wheel. Another objective is such a vehicle with six wheels, comprising: a driving wheel and two freely rotatable wheels having axes that extend across a rear part of the vehicle; and a steerable wheel and two freely rotatable, swivelly mounted wheels that are laterally spaced across a forward part of the vehicle. Other objects and the specific structure of the invention will be apparent from the following specification and the accompanying drawings.

IN THE DRAWINGS

FIG. 4 is a top plan view, similar to FIG. 1, showing two freely rotatable, vehicle-stabilizing sidewheels at the middle of the craft;

FIG. 5 is a view in vertical section from the plane 5—5 of FIGS. 1 and 4, and showing an assembly of the front steerable wheel and its mounting;

FIG. 6 is an elevational perspective view of a pivotally mounted, freely rotatable front wheel, before it is attached to the vehicle frame;

FIG. 7 is a fragmentary sectional view from the plane 7—7 of FIGS. 1 to 4, showing a freely rotatable sidewheel assembly, before application of the bumper around the vehicle;

FIG. 8 is a top plan view of a used can, optionally utilized with other such cans, end-joined, in the body and wheel mountings of FIGS. 5, 7 and 9, instead of the tubes there shown;

FIG. 9 is a fragmentary sectional view, illustrating a plastic-pipe body frame as having an arched top (or, optionally, a downwardly curved, wheel-supporting bottom);

FIG. 10 is a fragmentary sectional view of an optional type of joint between adjacent pairs of tubular-element ends; and FIG. 11 is a fragmental sectional view of another optional type of this joint.

This invention comprises a vehicle having a single steerable front wheel and a single power-driven rear wheel that are alined in a longitudinal driving axis that is offset from the central fore-and-aft line C of the vehicle, and (for safe stability) freely rotatable wheels on opposite sides of this driving axis, preferably within wheel walls in wide, tubular member buffer means. FIG. 1 to 4 slow various arrangements of this ruggedly simple, car-stabilizing driving and steering assembly. In America and some other countries where vehicles are driven on the right-hand side of the road, the rubber-tired wheels 1 and 2 are offset from the central line C toward the left-hand side of the road — the wheel 2 being a rear driving wheel (which for example may be of the type shown in this inventor's U.S. Pat. No. 3,575,251), and the wheel 1 being a steerable, motorcycle-like front wheel of the type shown in FIG. 5. But in some other countries, where motor cars are driven on the left side of the road the driver and the aligned steerable wheel 1 and powered wheel 2 are offset from the central longitudinal line C toward the right edge of the vehicle, as indicated in FIG. 2.

Figure 1:
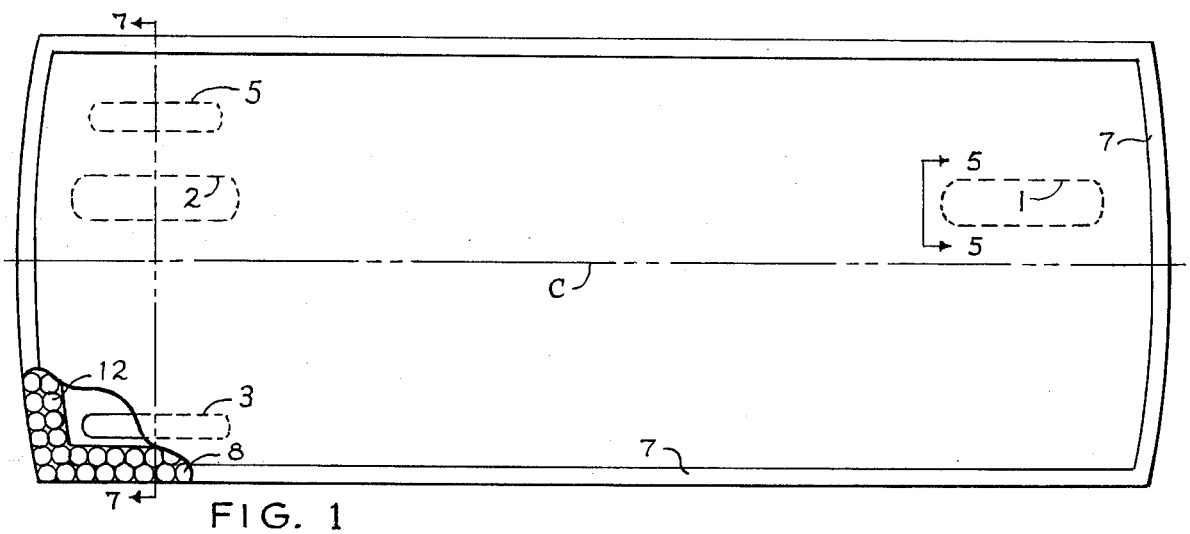
FIGS. 1 and 2 are top plan views of the invented vehicle, showing alternative arrangements at its rear of a driving wheel and two freely rotatable wheels that are laterally spaced from it, a portion of the body being shown as broken away in horizontal section just below the floor level.
Figure 2:
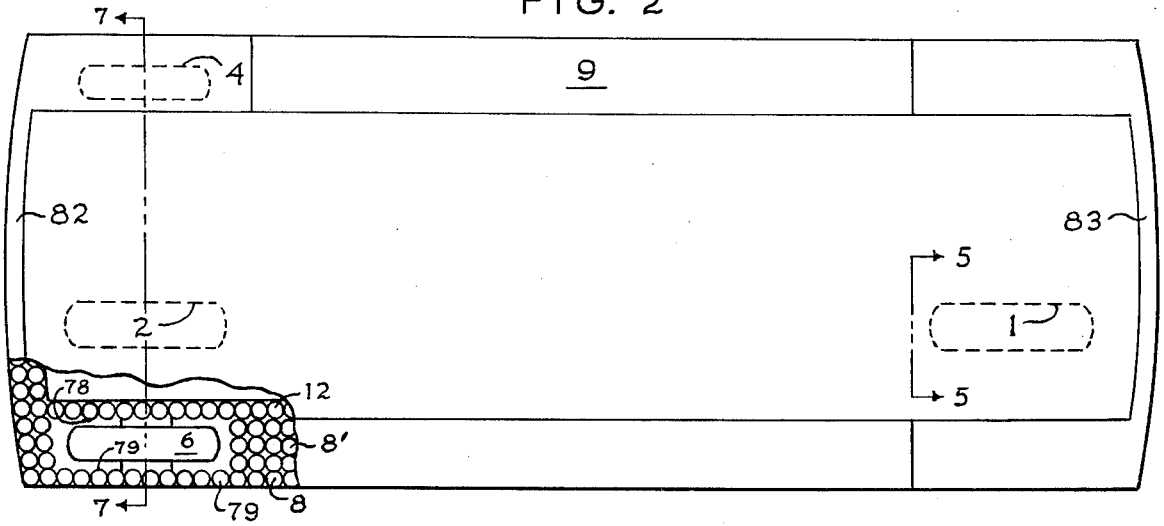

The wheel assemblies of FIGS. 1 and 4 are similar, but in FIG. 1 the sidewheels 3 and 5 are illustrated as at the rear of the vehicle, and in FIG. 4 they are shown at its middle part. In both FIGS. 1 and 4, the freely rotatable, vehicle-stabilizing right wheel 3 and its support are preferably constructed and arranged to continually contact the road, but optionally, and like the rubber-tired left wheel 4 of FIG. 2, it may be clear of the roadway in normal travel and contact the road only in excessive, dangerous roll of the vehicle toward its fore-and-aft plan. The other freely rotatable stabilizing wheel of FIGS. 1 and 4, shown at 5, is preferably clear of the roadway in normal travel, but may contact the road on dangerous tilting of the vehicle toward the left. This rubber-tired wheel 5 is shown as being of smaller diameter than the driving wheel 2; but when the wheel-supporting bottom of the vehicle is curved downward (as in FIG. 9, inverted) a road-clearing, stabilizing wheel such as 4 or 5, may be of the same diameter as the driving wheel 2, and in this event the normal clearance between the sidewheel and the road is obtained because of the downward bow of the bottom.

In FIG. 2, the rear sidewheel that is continually in contact with the road, indicated at 6, is on the same side of the center line C (shown in FIG. 1) as the driving wheel. This arrangement is satisfactory when most of the weight of the vehicle is on the driver's side (the left-hand side in America, the right-hand side in Great Britain and some other countries) and/or when its driver's side supports a lighter-than-air balloon of the type shown in the inventor's U.S. Pat. No. 3,575,251, this balloon tending to lift only the driver's U.S. Pat. No. 3,575,251, this balloon tending to lift only the driver's side of the vehicle. But, although optional, this relation of the wheels in FIG. 2 is not currently preferred.

In FIGS. 1 and 4, relatively narrow buffers or bumpers, 7 extend all around the vehicle, and from a level approximately at the axle of the sidewheels up to or a little above the floor level. The tubular members 8 of each of these bumpers (and also of the wider buffer means of FIGS. 2 and 3) may be single elongated cans of resilient, shape-retaining plastic or vertically stacked tiers of end-joined metallic or rigid plastic cans of the general type indicated in FIG. 8 at 10. These bumper tubular members are preferably filled with frangible elements — for example, glass fibers, tufts of rock wool, shredded foamed plastic, preservative-treated popcorn or the like. The bumper cans or tubular members are sheathed at their top, bottom and exteriorly lateral surfaces by flexible, waterproof material — for example, rubber-coated nylon or other fabric, fastened to the tubular elements by epoxy putty or other bonding material.

The body-frame tubular members shown at 12 may be plastic or thin-metal tubes, which may be jointed as in FIGS. 9, 10 or 11, or rows of thin-metal, plastic or glass cans of the general type shown in FIG. 8 at 10, end-joined by bands of adhesive tape and/or bonding material (solder, epoxy putty, silicone-rubber cement or the like). These body-frame tubular members (comprising cans or tubes) preferably are filled with insulation, 14. When used cans of the beverage type are utilized their openings preferably are sealed over by pieces 16 of adhesive tape. The tubes or cans 12 are held together between layers of stuccoed mesh; and the tubes or cans of the buffer means (8 and 12; or 8, 8' and the lower extension of the body framework) are preferably held together by silicone-rubber cement, epoxy putty or other bonding material and the flexible bumper skin.

Figure 3:
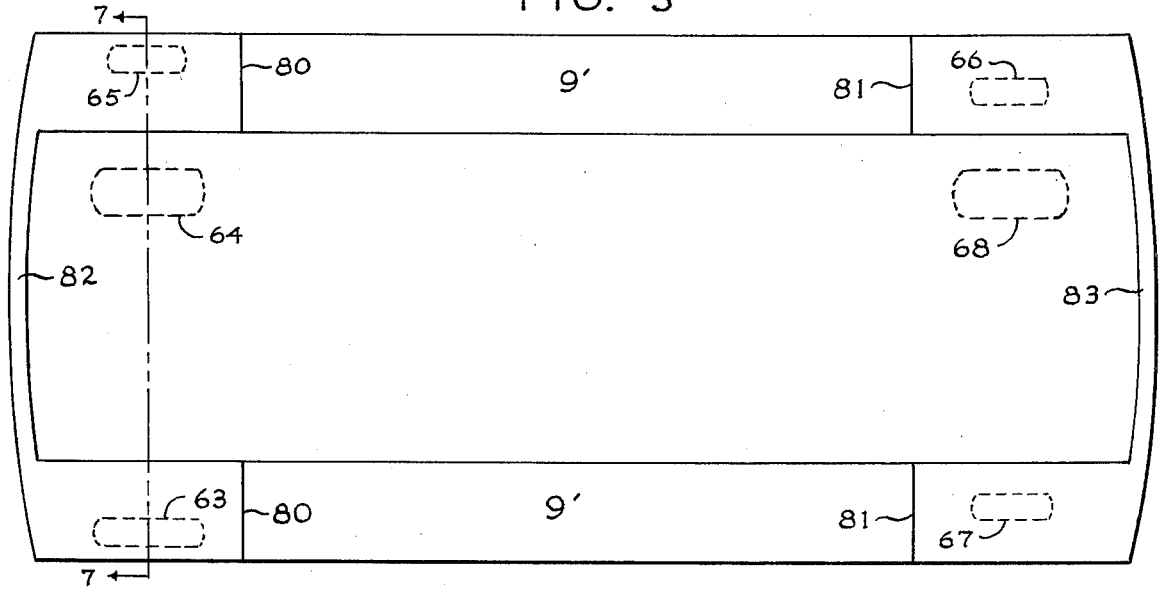
FIG. 3 is a top plan view of such a vehicle having six wheels — at the rear a driving wheel between two freely rotatable sidewheels; and in front a steerable wheel between two freely rotatable, pivotally mounted wheels.

In the preferred form of bumper and sidewall location shown in FIGS. 2 and 3, on each side of the vehicle, the outer tubular members 8 are outside of the sidewheels and the inner tubular members 8' stop short of the sidewheel at each end of the vehicle. The upper part of each sidewheel is thus housed within the tubular members 8, 8' and 12, and its bearings are supported on one side of the wheel by bumper tubular members 8 and on its other side by body-frame tubular members 12.

An alternative type of mounting for the sidewheels is shown in FIG. 7. This wheel-supporting assembly is illustrated as comprising lengths of plastic or thin-metal pipe, pipe tees and short lower beams 18; but cans of metal, plastic or glass may be substituted for the pipes. As illustrated, this assembly comprises: a plurality of parallel tees 20, each of which is bonded by plastic solvent, epoxy or other bonding material to an end of a floor-frame tubular element 21; a short pipe 22 that is bonded in a downward projection of each of the tees 20; parallel tees 23, each being bonded on the lower end of a body-sidewall element 24; a short floor tubular member or element 25, bonded in a tubular projection of each of the tees 20 and 23; an upright tubular element or member 26, bonded in a downward projection of each tee 23; a cap 27, bonded to the lower end of each of the elements 22 and 26 and fastened by epoxy putty or other bonding material to a beam 18; a box 28, of metal or molded, reinforced plastic, open at its bottom, fixed by epoxy putty and rod-like fastening means (bolts, screws or the like) to the beams 18 and by epoxy putty to the tees 20 and 23; a pair of bearings and guide channels, fixed to inside surfaces of the box 28, each including a bearing strip 29 and flanges 30 between which the wheel bearings may vertically reciprocate; an optional slide and thrust bearing on each end of the axle 31; antifriction bearings on each side of the wheel; a pair of shock absorbers 32, of any known shock-absorber design; a pair of detachable bars 33, one of which supports the outer race of the antifriction bearing on each side of the wheel; and means comprising rod-like elements (bolts, screws or the like) detachably fastening the bars 33 to flanges on the forward and rear end-walls of the box 28. By jacking up the vehicle and releasing these rod-like fastening elements at the forward and rearward ends of the bars 33, the sidewheel assembly, on each side of the vehicle, may be removed from the rest of the vehicle, for its repair or replacement.

The assembly of the motor, power transmission and rear driving wheel 2 may be of the type set forth in the inventor's prior U.S. Pat. No. 3,575,251 or any other known type of single, rear, vehicle-driving wheel and power means. Preferably: the power means utilized comprises an electric motor and batteries; and the motor, power-transmission (preferably a chain and sprockets), the rear wheel, and its bearings are shock-absorbingly reciprocable in a housing which is detachable from below the vehicular body, for repair, replacement of parts or replenishing battery solution.

Although any known type of exterior and interior body-skin means may be used, for extra strength at least the outer skin preferably comprises stucco (of Portland, mortar, epoxy or other cement, mixed with fine, light-weight, porous aggregate) troweled or sprayed on composite mesh of hardware cloth or the like, topped by wire mesh of the poultry-fence type. The inner skin optionally also may comprise these materials. After the skin means is formed the bumpers are fixed to lower parts of the body and sidewheel-support structure.

A preferred form of the assembly of the front, steerable wheel and its bearings and supports is shown in FIG. 5. This assembly includes: the wheel 1 and its axle; the rotatable fork 34, in the lower ends of which the outer races of the bearings 35 are held; a box-like or channeled metallic element 36 which bridges space between two groups of the parallel floor tubular members and has lower projections that extend below the bottom floor skin; the metallic plates or bars 37; epoxy putty and the bolts or other rod-like elements 38 which permanently fasten the plates 37 to the ends of the floor tubes that form a gap for interposition of the steering-wheel assembly; the bolts 39 which detachably fasten together the elements 36 and 37; the lower, detachable steering-post part 40 which is journaled in radial-and-thrust bearings mounted in or on the element 36 and has lower, annularly-arranged teeth or tongues which at 41 fit in grooves or valleys in the upper end of the fork 34, these cooperating teeth allowing the fork and wheel to move upward under shock, but preventing rotation between the fork and shaft part 40; the shock absorber 42 (of any appropriate known type), which absorbs shocks on the wheel and fork, cushioning their upward movement relatively to the steering post; the separate plates or disks 43, each of which is welded or otherwise fixed to an end of one of the steering-shaft parts; the bolts 44 which detachably fasten the elements 43 together; and the steering wheel 45 (or equivalent motorcycle-type handle bars).

The top of the vehicle is preferably arched and optionally may be constructed of end-joined cans as indicated in FIG. 5 of application Ser. No. 462,734 or plastic or thin-metal pipes as shown in present FIG. 9. Here, ends of lengths of preferably plastic pipe, 49 and 50, are shown as end-joined by and within the couplings 51. At the angled-beam member 52 of each upper corner of the vehicular body adjacent ends of the composite tubular members are sheathed and bonded in commercially obtainable end caps 27; and these end caps are fastened to the angular member by plastic solvent or epoxy putty or other glue and bolts or rivets. In forming each of these curved tubular members, straight, extruded-pipe portions 49 and 50 are cut to the desired lengths and their ends are fastened in the couplings 51 and caps 27 by plastic solvent, glue or other bonding material. Then the tubular member is bent to the desired curvature. When the pipe lengths are of semi-rigid plastic the member may be bent without heating, but when they are of rigid plastic they are sufficiently heated for bending into the curve. Wire mesh, similar to that of FIG. 7, is shown at 53, the outer and inner layers of which are fastened together by the bolts 54, extending between pipe lengths. Stucco is troweled or sprayed on the wire mesh. Although the bottom of the vehicle may be formed as indicated in FIG. 9 when this figure is turned upside down, this type of bottom, requiring additional, straight floor tubes or the like between ends of the bowed tubes, is not currently preferred.

FIGS. 10 and 11 show alternative types of junctions between pipe lengths. In FIG. 10 two caps, 55 and 56, are bonded on ends of the tubes 49 and 50, and these end caps are fastened together by plastic solvent or epoxy putty or the like and/or bolts (or rivets), 57. Optionally the composite element 55–56 may be integrally molded of plastic. In FIG. 11, the lengths of pipe 58 and 59 preferably are of plastic, molded to provide at each end of the tubular element a screwthreaded portion of larger outside diameter than the middle part of the pipe length; and on these screwthreaded pipe ends the coupling 60 is screwed. This coupling optionally may be continuously screwthreaded from end to end, but preferably and as shown it comprises an integral, tubular-member-strengthening middle element 61. Optionally, the tubular elements 58 and 59 may be lengths of standard extruded pipe, and the screwthreads on 58 and 59 may be formed by a screwthread-cutting device. In assembly of this joint, epoxy or other cement may be placed on the screwthreads of 58, the element 60 screwed on 58 until stopped by 61, and the screwthreads of 59, coated with cement, are then screwed into 60.

The preferred form of this invention is shown in FIG. 3, where the rear three wheels are somewhat similar to the rear wheel assembly of FIG. 1. The freely rotatable wheel 63 and the vehicle-driving wheel 64 are of the same diameter and are continually in contact with the road during travel; and preferably the freely rotatable wheel 65 is normally clear of the road surface and contacts it only when the vehicle tilts to the right by a substantially predetermined amount. Optionally but not preferably, all six of the wheels 63 to 67 may be constructed and arranged to continually contact the ground in travel.

For extra safety against overturning, this form of the invention optionally has two other freely rotatable wheels, 66 and 67, abreast of the steerable wheel 68. These caster wheels 66 and 67 preferably are swivelly mounted with respect to the vehicle body, for example as indicated in FIG. 6. In this figure the wheel (66, 67) is rotatably mounted on bearings supported by the metallic fork arms 70, and these arms are welded or otherwise joined at their top to the metal plate 71 which has fixed to it a stub shaft 72 that is journaled in the radial-and-thrust bearing 73. The outer race of this antifriction bearing 73 is fixedly supported in the metal pipe 74, and the top of this pipe is welded or otherwise fixed to the upper plate 75. This plate is within a box-like or channeled metallic element that is similar to the element 36 of FIG. 5 and, like 36, is detachably supported from plates 37 by bolts 39. The plate 75 is detachably fixed to the floor by bolts extending thru and the holes 76 and into the top of the element 36; but in this caster support the hole for the steering shaft thru the top of 36 as it is illustrated in FIG. 5 optionally may be eliminated. These freely rotatable caster wheels 66 and 67 are thus constructed and arranged relatively to the vehicle floor and the combined bumper and running-board steps 9' to swivel, so that when one of them contacts the roadway on excessive lateral tilting of the forward portion of the vehicle it pivots until it is aligned with the direction of travel.

As indicated in FIG. 3, the running-board part 9' of the buffer means (of the combined bumper-and-running-board) is wider than the side part of FIG. 2 — with sufficient distance between the points 78 and 79 of the outer line of the body-frame tubular members 12 and the inner line of the outer row of bumper tubular members 8 (FIG. 2) for the wheels 66 and 67 to revolve entirely around when the vehicle is beginning to back up. Each of the flat steps of the combined bumper and running board (footboard) extends between the lines 80 and 81. This step on each side, topped by a layer of tough rubber of the type used in antiskid rubber or vinyl runners for halls or stair treads, has a level slightly lower than that of the floor. From each of the rear lines 80 the bumper of this vehicle border curves up over a freely rotatable rear sidewheel and joins with the rear bumper portion 82; and from each of the forward lines 81 the buffer similarly curves up over a front wheel and joins with the forward bumper portion 83. These bumper portions 82 and 83 are at a level a little above the top points of the freely rotatable sidewheels. On one side of the vehicle the combined bumper and running-board step, between 80 and 81, may also serve for carrying elongated materials from stores to residences or shops.

Various changes may be made within the scope of the following claims. For instance: (1) the swiveled, freely rotatable wheel 67, on the side of the central longitudinal line C of the vehicle opposite from the offset steering and driving wheels, may be of the same diameter of the steerable wheel 68, and in this event four of the wheels are continually in contact with the road surface during travel; (2) in the form of the vehicle shown in FIG. 3, the wheels 65 and 66 may be eliminated; (3) a lighter-than-air balloon or balloons may be placed at the top of the vehicle as indicated in this inventor's prior U.S. Pat. No. 3,575,251, thus aiding in stabilizing the craft against roll and increasing its height for better vision of it from other cars and additional safety on crowded highways; (4) when the vehicle is adapted for use as an aircraft, as well as a land-traversing craft, wings may be provided, having spars extending thru the body frame and out thru sidewall gaps; and (5) when cans are utilized in the bumper or body frame, these may be used beverage cans, paint cans or coffee cans, filled with light-weight insulating material — for example, molded bits of foamed plastic such as are sold in large quantities for use in packing, or cut or ground bits of scrap foamed plastic.

In the claims, unless otherwise specified, the term "tubular members" means individual tubes, individual cans, or rows of end-joined cans, of any material, and "substantially vertical" means vertical or within 45° of vertical.

I claim:

1. A land vehicle comprising: a framework including a floor, front, rear and side walls; buffer means extending along the outside of said side walls, said buffer means comprising a plurality of rows of tubular members, and means for covering and holding said tubular members together; a forward, normally ground-engaging steerable wheel, means for mounting said steerable wheel on one side of a fore-and-aft center line of said framework; a rearward, normally ground-engaging, driving wheel; means for mounting said driving wheel on said one side of said center line; forward and rearward wheel wells formed between some of said tubular members and the said side wall on the other side of said fore-and-aft center line; a rearward side wheel; bearing means for freely rotatably mounting said rearward side wheel about a horizontal axis in said rearward wheel well; a forward side wheel; and bearing means for freely rotatably mounting said forward wheel about a horizontal axis and for freely swivelly mounting said forward wheel about a substantially vertical axis in said forward wheel well.

2. A vehicle as set forth in claim 1, in which there is normally a clearance between said forward side wheel and the ground, said forward side wheel coming into ground contact when said vehicle rolls toward said forward side wheel to eliminate said clearance.

3. A vehicle as set forth in claim 1, further including, on the same side of said center line as said steerable and driving wheels: a second rearward wheel well formed between some of said tubular members said side wall on said same side; a second rearward freely rotatable side wheel; and bearing means for mounting said second rearward side wheel about a horizontal axis in said second rearward wheel well.

4. A vehicle as set forth in claim 3, in which there is normally a clearance between said second rearward side wheel and the ground, said second rearward side wheel coming into ground contact when said vehicle rolls toward it and eliminates said clearance.

5. A vehicle as set forth in claim 3, further including, on the said same side of said center line: a second forward wheel well formed between some of said tubular members and the said side wall on said same side; a second forward side wheel; and bearing means for freely rotatably mounting said second forward side wheel about a horizontal axis and for freely swivelly mounting said second forward side wheel about a substantially vertical axis in said second forward wheel well.

6. A vehicle as set forth in claim 5, in which there is normally a clearance between the second forward side wheel and the ground, said second forward side wheel coming into ground contact when said vehicle rolls toward it and eliminates said clearance.

7. A vehicle as set forth in claim 1, in which said buffer means extends all around said front, rear and side walls.

8. A vehicle as set forth in claim 1, in which: the said tubular members of the buffer means comprise cans; and said buffer means comprises at least one outer row of said cans on the outer side of each of said sidewheels and its wheel well and a plurality of rows of cans between said outer row and an adjacent one of said framework side walls, the said last-named rows being shorter than said outer row and having a clearance between them and the perimeter of each of said sidewheels.

9. A vehicle as set forth in claim 1, in which said means for mounting the steerable wheel includes: a steering fork stradling the upper part of said steerable wheel; bearings for the steerable wheel supported by lower portions of said fork; a steering post above and connected to an upper portion of said fork; and manually operable means for rotating said steering post.

10. A vehicle as set forth in claim 24, in which the said steering post comprises two connected portions, detachable, for downward withdrawal, below said floor, of the lower one of said connected portions and said steerable wheel.

11. A vehicle as set forth in claim 1, in which each of said second rear sidewheel and said forward sidewheel has a smaller perimeter than said driving wheel.

* * * * *